Oct. 28, 1952 H. L. BURNS 2,615,463
FLUID PRESSURE APPARATUS AND VALVE MEANS THEREFOR
Filed Nov. 14, 1945 3 Sheets-Sheet 3

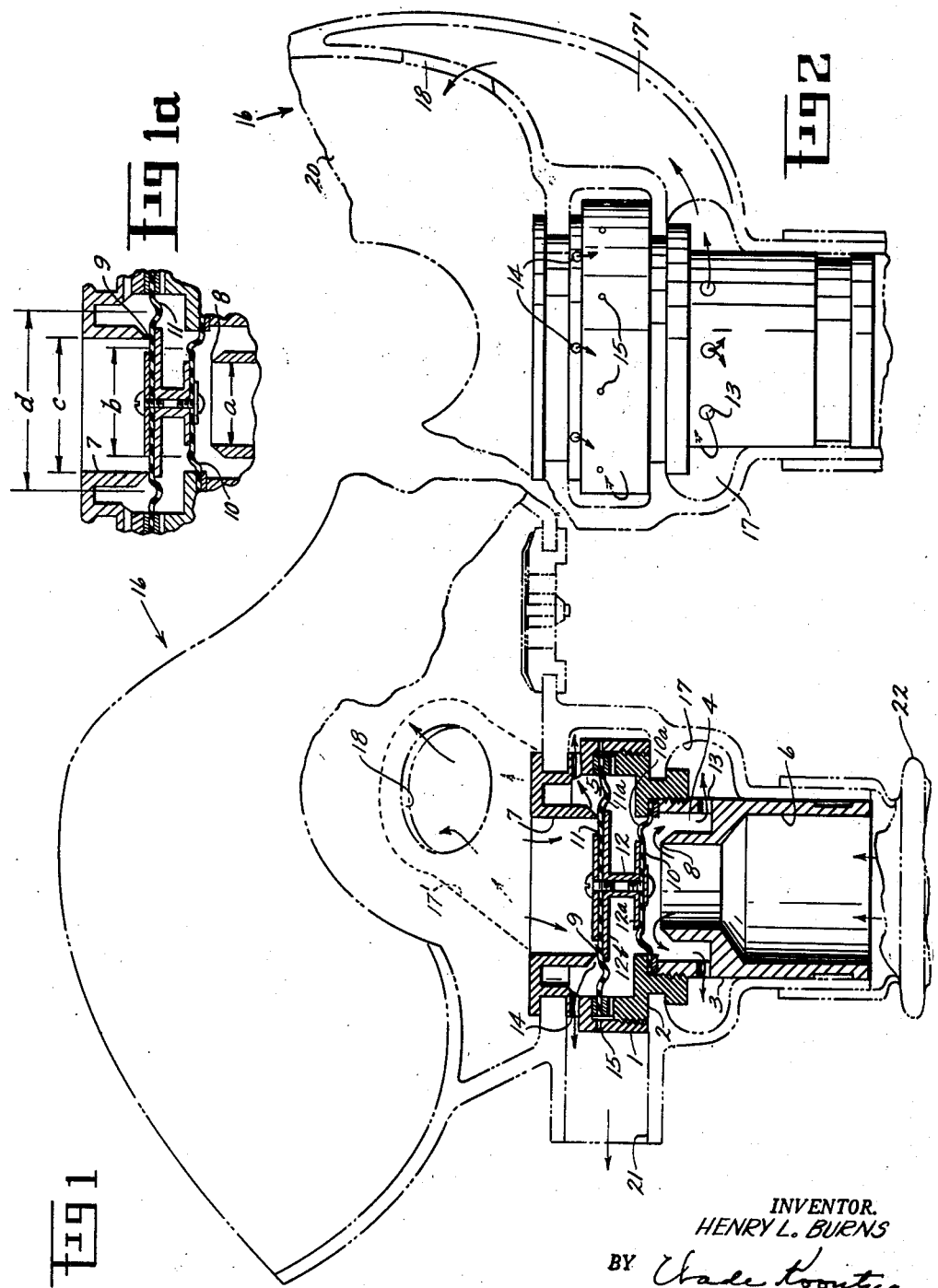
Oct. 28, 1952  H. L. BURNS  2,615,463
FLUID PRESSURE APPARATUS AND VALVE MEANS THEREFOR
Filed Nov. 14, 1945  3 Sheets-Sheet 1
INVENTOR.
HENRY L. BURNS
ATTORNEYS

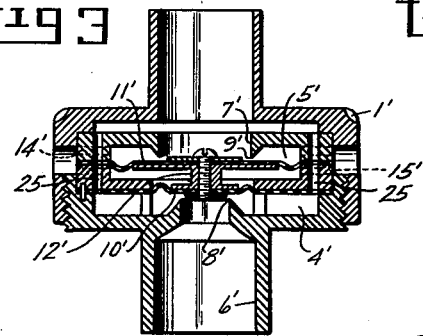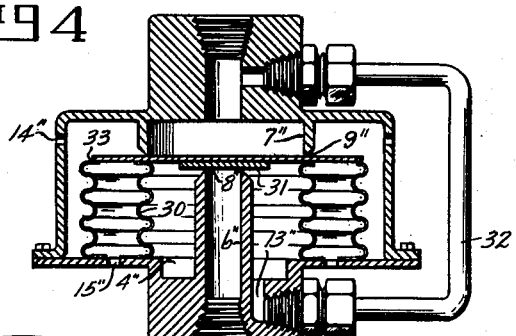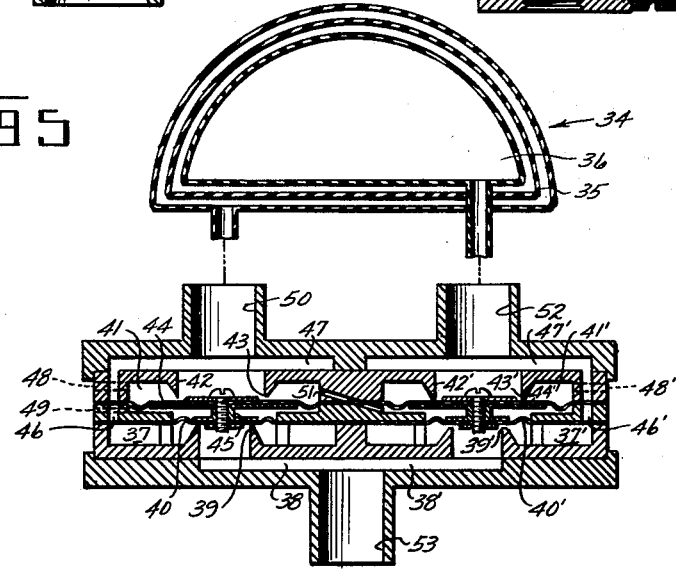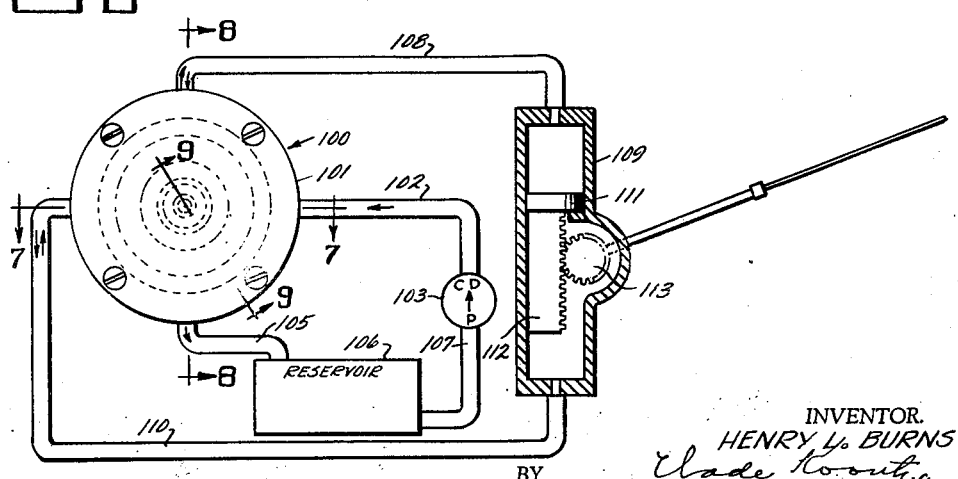

INVENTOR.
HENRY L. BURNS
BY
ATTORNEYS

Patented Oct. 28, 1952

2,615,463

UNITED STATES PATENT OFFICE 2,615,463

FLUID PRESSURE APPARATUS AND VALVE MEANS THEREFOR

Henry L. Burns, Yellow Springs, Ohio

Application November 14, 1945, Serial No. 628,644

26 Claims. (Cl. 137—64)

(Granted under the act of March 3, 1883, as amended April 30, 1928; 370 O. G. 757)

The invention described herein may be manufactured and used by or for the Government for governmental purposes without payment to me of any royalty thereon.

This invention relates to fluid pressure apparatus wherein it is desired to convert a substantially constant fluid pressure supply into an alternating build-up and reduction of pressure in a fluid pressure system, and, more particularly, this invention relates to fluid pressure actuated valve means for accomplishing this result in such systems.

One application of the invention is to breathing apparatus designed to supply oxygen to a person to assist respiration and, particularly, to such apparatus designed to produce artificial respiration in a person who has stopped breathing or whose respiration rate is subnormal. Valve means have heretofore been provided which are capable of automatically functioning to control the supplying of oxygen to a person's lungs and the exhaust of gas therefrom in regularly recurring cycles. Such valve means have comprised intake and exhaust valves so associated that oxygen from a constant pressure source is supplied to the person's lungs and prevented from escaping therefrom to the atmosphere until the pressure in his lungs reaches a predetermined maximum whereupon the valves are automatically actuated to cut off the supply of oxygen and permit the gas within the person's lungs to escape to the atmosphere. Such valve means heretofore provided have been capable of functioning automatically so that when the pressure of gas within the person's lungs falls to a predetermined minimum, the positioning of the valves will be automatically reversed so that oxygen is again supplied to the person's lungs and prevented from escaping to the atmosphere until the pressure of the gas within the person's lungs again reaches a predetermined maximum.

The automatically cycling valve means for this purpose heretofore provided have taken diverse forms of more or less complexity and usually requiring some form of force magnifying leverage interconnecting the respective intake and exhaust valves to produce the respective inhalation and exhalation phases of the artificial breathing cycle. Such valve means requiring mechanical or electrical operating means and linkages of more or less complexity involve certain well known difficulties in their practical operation, are to some extent unreliable, necessitate the employment of precision methods in their manufacture, and are comparatively expensive. The present invention provides a very simple and efficient valve means which does not require such mechanical or electrical operating means and linkages and is not subject to the difficulties in operation and manufacture to which the valve means heretofore employed for this purpose have been subjected.

Another application of the invention is to the provision of automatically reversing valve means for fluid motors and the like.

It is a principal object of the invention to devise a novel and very simple and efficient means for converting any substantially constant fluid pressure from any suitable pressure source into an alternating build-up and reduction of pressure in any substantially closed system.

A particular object of the invention is to provide a novel pressure actuated valve means adapted especially for use in conjunction with breathing apparatus to provide automatic cycling for artificial resuscitation.

Another object of the invention is to provide a valving means which will convert any substantially constant fluid pressure from any suitable source into an alternating build-up and reduction of pressure in each of two separate substantially closed systems and so operate to effect build-up and reduction of pressure in reverse relation in said two closed systems.

Another object of the invention is to provide a pressure actuated valve means of the type referred to in which no toggle or mechanical snap acting mechanism, springs, bearings, pivot joints or mechanical or electrical valve positioning means are required.

Another object of the invention is to provide a pressure actuated valve means of the character described which is small, light, compact, simple in construction, easily fabricated, contains nothing that will get out of adjustment, and is adapted to any form of installation.

Another object of the invention is to provide pressure actuated valve means of the type referred to which requires no manipulation in connection with its operation to effect an alternating build-up and reduction of pressure in a closed system with which it is associated.

Another object of the invention is to provide valve means of the character described which is capable of automatically adjusting itself to the supply pressure, thereby making it possible to control operating pressures by merely changing the supply pressure.

Another object of the invention is to provide pressure actuated valve means of the type referred to which, when associated with breathing apparatus, is designed to supply oxygen to a person's lungs and will operate to provide automatic alternate inhalation and exhalation cycles easily activated by the person breathing and automatically following his normal breathing pattern.

Another object of the invention is to provide pressure actuated valve means of the type referred to which may be made to cycle automatically or which may be made to cycle only at will.

Another object of the invention is to provide pressure actuated valve means of the type referred to which, when associated with breathing apparatus, is adapted to supply oxygen to a person's lungs and will cycle automatically at a rate determined by the demand of the user in accordance with his breathing pattern unless his respiration rate does not exceed a predetermined minimum rate under which condition the valve means will cycle at a predetermined minimum rate to provide artificial resuscitation.

An important feature of the invention resides in the provision of a movable valve member, and means for subjecting said member to the influence of fluid pressure tending to move it toward an open position, said movable valve member having a greater fluid pressure loading capacity tending to move it toward open position when said said member is in an open position than when it is in a closed position. Pressure loading means is provided for applying a fluid pressure force to said valve member urging the same toward a closed position. The valve means may comprise a housing including two ports, one of which is controlled directly by a movable valve member cooperative therewith, and means of communication being provided between said ports when the valve members is in open position, the effective orifice of the second port being less than the effective orifice between the valve member and the port with which the valve member cooperates when the valve member is in fully open position.

Preferably, the valve mechanism of the invention comprises a pair of movable valve elements arranged for opposed operation whereby, when one of said valve elements is moved toward open position, the other valve element is moved toward closed position, separate means for subjecting each of said elements to the influence of fluid pressure tending to move it toward an open position, each of said valve elements having a greater fluid pressure loading capacity tending to move it toward open position when the respective valve element is in an open position than when it is in a closed position, and one of said valve elements having a fluid pressure loading capacity when in closed position greater than the fluid pressure loading capacity of the other valve element when the latter is in an open position.

In the embodiment of the invention herein disclosed, each of the valve elements has a greater fluid pressure loading capacity tending to move it toward an open position when it is in open position than when it is in closed position; one of the valve elements has a greater fluid pressure loading capacity tending to move it toward open position when it is in closed position than the similar fluid pressure loading capacity of the other valve element when the latter is in closed position; one of the valve elements has a greater fluid pressure loading capacity when it is in open position than the fluid pressure loading capacity of the other valve element when the latter is in open position; and one of the valve elements has a greater fluid pressure loading capacity when in closed position than the fluid pressure loading capacity of the other valve member when the latter is in open position.

To the foregoing ends, each of the valve elements has a greater effective area subject to fluid pressure tending to move it away from its seat when it is unseated than when it is seated; one of the valve elements has a greater effective area subject to fluid pressure tending to move it away from its seat when it is seated than the similarly effective area of the other valve element when the latter is seated; one of the valve elements has a greater effective area subject to fluid pressure tending to move it away from its seat when it is unseated than the similarly effective area of the other valve element when the latter is unseated; and one of the valve elements has a greater effective area subject to fluid pressure when seated than the similarly effective area of the other valve member when the latter is unseated.

Means is preferably provided for subjecting the valve elements to ambient pressure in such a manner that their action is not affected by changes in barometric pressure.

In the embodiments of the invention herein disclosed, each of the valve elements is adapted to control the passage of fluid in a respective duct. Each of the ducts is provided with a seat with which the respective valve element is cooperable to close the same. Each of the valve elements forms one wall of a respective chamber with which one of the ducts communicates when the respective valve element is unseated. The cross-sectional areas of the valve seats determine the effective areas of the respective valve elements subject to fluid pressure when seated. The cross-sectional area of one of the valve seats is greater than the cross-sectional area of the other valve seat. Also, the cross-sectional area of one of the valve seats is greater than the effective area of the valve element co-acting with the other valve seat when the latter valve element is unseated or in open condition.

The chambers are provided with outlet ports and preferably the total effective area of the outlet port or ports of each chamber is less than the effective orifice area between the valve seat and the valve element of that chamber when the valve element is fully unseated or in full open condition. One of the ducts is adapted to be subject to the fluid supply pressure and the other of the ducts is adapted to be subject to the pressure of fluid within the closed system, or in other words, the delivery or discharge pressure. A means of communication is provided between one of the chambers through the outlet ports therein and the duct communicating with the other chamber when valve element controlling that duct is unseated or in open condition.

The valve elements may comprise respective diaphragms, or sylphon bellows members, or piston members, or they may assume any form by which they are capable of providing a movable wall of one of the respective chambers. Preferably, the valve members are arranged in a common housing and rigidly connected for unitary movement. In such event, the space between the valve members within the housing may be subjected to atmospheric pressure through a port suitably provided in the housing.

In one form of the invention, a pressure actuated valve means is provided which will serve to convert any constant supply pressure into an alternating build-up and reduction of pressure in two independent closed systems in a reversed manner; i. e., such that when pressure is built up in one of the systems, reduction of pressure is effected in the other system.

To this end, a valve mechanism is provided comprising first and second valve instrumentalities, each of said valve instrumentalities comprising a pair of movable valve elements interconnected for opposed operation and arranged in an organization as previously described. However, in this embodiment of the invention, only one of the valve instrumentalities has its valve elements continuously subjected to the influence of ambient pressure in a manner to compensate for changes therein. The valve elements of the second valve instrumentality, in this embodiment of the invention, are subjected alternately to the discharge pressure of the first valve means and to the influence of ambient pressure.

Further objects, advantages, and features of the invention will become apparent from the following description taken in conjunction with the accompanying drawings in which Fig. 1 is a sectional view through a pressure actuated valve device of the invention illustrating the manner of its association with an oxygen mask and an oxygen supply conduit.

Fig. 1a is an enlarged fragmentary view of the valve elements of the device of Fig. 1 illustrating important dimensional relationships.

Fig. 2 is an external view of the valve device taken in a direction at right angles to the view of Fig. 1, and illustrating the association with an oxygen mask.

Fig. 3 is a sectional view of a slightly modified form of the valve means.

Fig. 4 is a sectional view showing an embodiment of the invention wherein the valve elements comprise bellows elements.

Fig. 5 is a sectional view of a modified form of pressure actuated valve means adapted to convert a constant pressure into an alternating build-up and reduction of pressure in a reverse manner in two separate closed systems associated with said valve means, showing the valve means applied to the operation of a double chambered massaging cushion, the latter being shown in horizontal section.

Fig. 6 is a view showing another modification of the invention and illustrating diagrammatically its application to the operation of a windshield wiper motor.

Figure 7:
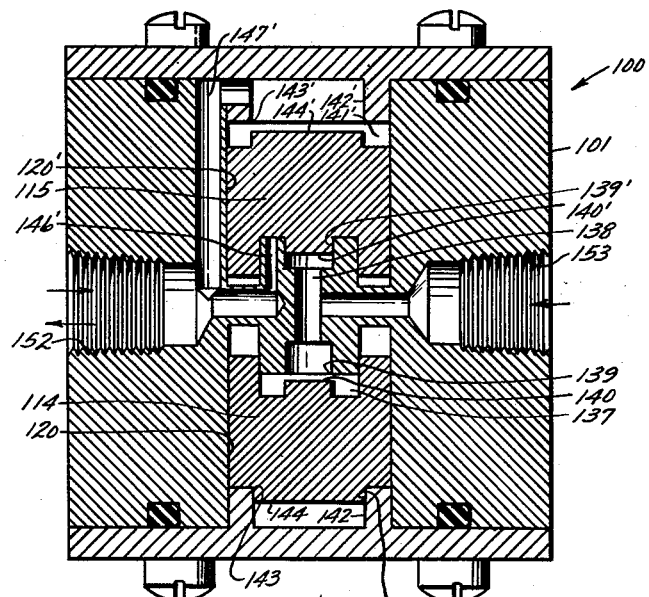
Fig. 7 is a sectional view taken about on the line 7—7 of Fig. 6.

Now referring more particularly to Figs. 1 and 2, the valve means there shown comprises a valve housing made up of parts 1, 2, and 3 which are secured together in the manner shown to provide an inlet or supply pressure chamber 4, an outlet exhaust pressure chamber 5, an inlet or supply pressure duct 6 communicating with the chamber 4, and a discharge duct 7 communicating with the outlet or exhaust pressure chamber 5. The inlet duct 6 has an inlet port providing a valve seat 8 and the discharge duct 7 has a discharge port providing a valve seat 9. A diaphragm 10 extending across the interior of the housing provides a movable inlet valve element forming one wall of the chamber 4 and adapted to co-act with the inlet valve seat 8 to close off the duct 6 from communciation with the chamber 4. Likewise a diaphragm 11 extending across the housing provides a movable discharge valve element forming one wall of the chamber 5 and adapted to cooperate with the discharge valve seat 9 to close off the duct 7 from communication with the chamber 5. The valve elements 10 and 11 are arranged for opposed operation whereby when one of said valve members is moved away from its seat, the other is moved toward its seat. To this end, a rigid connection 12 is provided for interconnecting the valve elements 10 and 11, whereby they act as an integral valve member, the flange portions 12a and 12b of connector 12 providing firm backing for the respective valve members 10 and 11 to insure sealing cooperation thereof with their respective seats. The ducts 6 and 7 constitute respective means for subjecting the respective valve elements 10 and 11 to the influence of fluid pressure tending to move said elements off their respective seats.

The chamber 4 is provided with outlet ports 13, the total effective area of which is less than the effective orifice between the inlet valve seat 8 and the valve member 10 when the latter is in the fully open position of Fig. 1. Similarly the chamber 5 is provided with outlet ports 14, the total effective area of which is less than the effective orifice between the valve member 11 and its respective seat 9 when the latter valve member is in fully open condition. Ambient pressure ports 15 are provided in the casing or housing made up of the members 1, 2, and 3 whereby the space within the housing between the valve members 10 and 11 is in communication with the atmosphere so as to compensate for changes in ambient pressure.

A means of communciation is provided between the inlet or supply pressure chamber 4 and the system pressure or discharge duct 7. For this purpose, in the embodiment of invention shown in Figs. 1 and 2, the oxygen mask body, shown in phantom lines and generally indicated by the numeral 16, is provided with an annular delivery duct or passage 17 having a branch passage 17' communicating with the interior of the mask 16 through a port 18. The interior face cavity 20 of the mask 16 communicates with the discharge duct 7. Thus, a means of communication is provided between the inlet chamber 4 and the discharge duct 7 through ports 13, duct 17, passage 17', port 18, the interior face cavity 20 of the mask, to the duct 7.

The body of the mask 16 is provided with an exhaust passage 21 affording communication with the atmosphere for ports 14 and 15. The duct 6, chamber 4, port 13, duct 17, passage 17', cavity 20, duct 7, chamber 5, ports 14, and passage 21 provide a continuous conduit for the passage of fluid.

The inlet conduit 6 is adapted to be connected by means of a flexible tubing 22 to a regulated source of oxygen (not shown). The supply pressure of oxygen preferably may be of the order of ten inches of water.

It will be noted that the diaphragm 10, which is preferably made of thin rubber, is a slack diaphragm clamped at its outer periphery and formed with a circular bead 10a. When fluid pressure is applied to such a diaphragm a portion of the force is transmitted to the clamping means so that the force applied by the diaphragm at its center to the valve spool 12 is less than the product of the total diaphragm area times the applied fluid pressure. It has been experimentally determined that in a beaded diaphragm of the type described, the force at the center equals the applied pressure times an effective area which is the area of a circle having a diameter equal to the mean diameter of the bead such as illustrated at the diameter $b$, in Fig. 1a. Similarly the effective diameter of the diaphragm 11 is the mean diameter of the bead or corrugation 11a, indicated by reference character $d$, in Fig. 1a.

Where a corrugated bellows is employed the effective diameter is given approximately as $.1963 \times (A+B)^2$ where A and B are the inside and outside diameters of the bellows corrugations respectively.

It will be understood that as hereinafter employed in the specification, the term effective area of a diaphragm refers to the equivalent area of a frictionless piston which if subjected to the same fluid pressure would develop the same force as measured at the center of the actual diaphragm. Obviously the effective area will be less than the actual area of the clamped diaphragm and the effective diameter will be less than the actual diameter of the clamped diaphragm. The effective diameter of the diaphragms as illustrated in Fig. 1a is similarly applicable to the figures of drawing illustrating further embodiments of the invention employing slack corrugated diaphragms such as illustrated in Figs. 3 and 5.

With reference to Figs. 1 and 1a it will be noted that the effective diameter "$b$," Fig 1a, and hence the effective diameter of diaphragm 10 is greater than the diameter "$a$" and the cross sectional area of the inlet valve seat 8 so that the force applied to the diaphragm by the inlet fluid pressure is greater when the valve is open than when it is seated. Similarly the effective diameter "$d$" and effective area of diaphragm 11 is greater than the diameter "$c$" and cross-sectional area of the duct 7 so that the force applied to the diaphragm by mask pressure is greater when the valve is open than when seated. Thus inlet and exhaust valves when just lifted from their seats are subjected to a large increase in force tending to move the valves in the opening direction giving the effect of a snap action in moving the valves very rapidly to the full open operation.

Attention is especially directed to the fact that the diameter "$c$" of the duct 7 is greater than the effective diameter "$b$" of the diaphragm 10, note Fig. 1a. The force acting on the diaphragm 11 when seated on valve seat 9, when the mask pressure reaches a predetermined maximum such as 6" to 8" H2O, can then exceed the force acting on the effective area of diaphragm 10 due to inlet pressure, of the order of 10" H2O, and can thus cause the valve assembly to move to open the exhaust valve and close the inlet valve. In actual practice the inlet pressure will be chosen so that the pressure delivered to the mask will not exceed the maximum safe lung inflation pressure so that the cross-sectional area of the valve seat 9 need only be slightly greater than effective area of the diaphragm 10 since the mass of the diaphragms and valve structure to be set in motion is very small.

This latter mentioned relation of the cross-sectional area of the valve seat 9 to the effective member of the valve element 10 is crucial to the automatic cycling operation of the valve means. However, the valve means of the invention has utility for certain purposes when it is not desired that the valve means shall automatically cycle. For example, under circumstances where it is desired to compel the person using the breathing apparatus to exhale against a predetermined pressure, the cross-sectional area of the valve seat 9 may be less than the total effective area of the valve element or diaphragm 10. Under such circumstances sufficient pressure to unseat the valve element 11 would never be built up in the duct 7 without the exertion of the person using the breathing apparatus to force exhalation to build up sufficient additional pressure to counterbalance the force of the supply pressure acting against the total effective area of the valve element or diaphragm 10 when the latter is unseated. Even under such circumstances, however, once the valve element or diaphragm 11 was unseated, its effective area then being greater than the effective area of the valve member 10, the force produced by the system pressure acting against the total effective area of the valve member 11 would cause the latter valve member to remain unseated and the valve member 10 to remain seated until the system pressure was reduced to a point at which the supply pressure acting against the valve member 10 over the area defined by the cross-sectional area of the seat 8 was sufficient to unseat the valve member 10.

The operation of the device of Figs. 1 and 2 will now be described. With the mask 16 placed on the face of the wearer and the inlet tube 22 connected to a regulated source of oxygen at a pressure of say ten inches of water, oxygen under pressure will then flow into the inlet conduit 6 and will act on the valve diaphragm 10 tending to lift the diaphragm 10 from the valve seat 8 with a force equal to the cross-sectional area of the valve seat 8 times the supply pressure. The valve 10 when cracked open will rapidly move to the full open position as seen in Fig. 1 and diaphragm 11 will move into sealing contact with valve seat 9 closing conduit 7 from communication with exhaust chamber 5.

Oxygen will then flow from conduit 6 into inlet chamber 4, through restricted passages 13 into the annular passage 17 and thence by way of branch passage 17' and port 18 into the interior cavity 20 of the mask 16. The lung-mask system pressure will gradually build up as the lungs are inflated until a predetermined pressure of the order of six to eight inches of water is reached at which time this pressure acting on the outlet valve area of diaphragm 11 gives rise to a force exceeding the pressure in inlet chamber 4 times the effective area of diaphragm 10 causing the outlet valve at seat 9 to crack open. As soon as the diaphragm 11 has lifted from seat 9 the mask pressure in conduit 7 acts on the larger effective area of the diaphragm 11 causing sufficient force to snap the outlet valve wide open and closing the inlet valve by causing diaphragm 10 to seat on valve seat 8.

The lung-mask system can then exhaust by way of conduit 7, valve seat 9, chamber 5 and restricting ports 14 to atmosphere. When the mask pressure has fallen to a value so that its force exerted on the effective area of diaphragm 11 is less than the force of inlet pressure on the inlet area of diaphragm 10 the inlet valve will open and the cycle will repeat indefinitely.

The device of Figs. 1 and 2 will operate in exactly the same manner with a conscious person except that the valve mechanism will shuttle in rhythm with the natural inspiration and exhalation cycles of the wearer.

It will be apparent that it requires a higher system pressure to unseat the valve element 11 than the system pressure required to maintain the valve means in the exhalation condition, due to the fact that when the valve element 11 is unseated, the system pressure acts upon a greater effective area of the valve element 11. Likewise, it will be apparent that the supply pressure force acting upon the valve element 10 is greater when the valve element 10 is unseated than when it is seated. Thus, the valve means will remain in exhalation or discharge condition over a predetermined pressure range from a predetermined high pressure within the system to a predetermined low pressure within the system.

In Figs. 3 and 4 the elements of the construction which are similar to those previously described have been given the same reference characters, but with a prime designation.

Now referring to Fig. 3, the construction of the valve means per se there shown is quite similar to that of Fig 1, except that the means of communciation between the inlet chamber 4' and the discharge duct 7' is provided by delivery passages 25 within the valve housing rather than exteriorly thereof through passage 17 and other communicating ducts as shown in the construction of Figs. 1 and 2. Duct 6', chamber 4', passage 25, duct 7', chamber 5' and ports 14' constitute a continuous conduit for the passage of fluid.

Referring to the construction illustrated in Fig. 4, the valve elements take the form of sylphon bellows members, the inlet valve element comprising sylphon bellows member 30, the closed end 31 of which cooperates with the seat 8'' to close off the conduit 6'' from communication with the inlet chamber 4'' comprising the interior of the bellows 30, which communicates through port 13'' and pipe 32 with discharge duct 7''. The latter duct 7'' is provided with seat 9'', with which the discharge valve element, comprising bellows 33, cooperates. In this embodiment of the invention the bellows 30 serves the same function as the diaphragm 10 of the device of Figs. 1 and 2 and has an effective area subject to inlet fluid pressure which is less than the cross-sectional area of the valve seat 9''. The bellows 33 serves the equivalent function of the diaphragm 11 of the device of Figs. 1 and 2.

Now referring to Fig. 5, there is illustrated an embodiment of the invention comprising a pressure actuated valve means adapted to convert a constant supply pressure into an alternating build-up and reduction of pressure in reverse manner in two separate closed systems. In Fig. 5, the apparatus illustrated is a massaging seat or cushion designed to relieve discomfort normally occasioned by persons required to sit for long periods without changing position, such as crew members of military aircraft required to sit in cramped conditions on long missions. The pillow or cushion comprises an outer flexible chamber 35 and an inner flexible chamber 36, said chambers being formed of rubber or other suitable material and the outer chamber extending around the inner chamber and arranged so that both of said chambers together are adapted to support the weight of a person sitting on the cushion or pillow. It is desired to cause an alternate build-up and reduction of pressure in each of the chambers 35 and 36 in a reverse relation; that is to say, such that when pressure is being built up in one of the chambers 35 or 36, the pressure is simultaneously being reduced in the other of said chambers whereby an undulating condition of the chambers 35 and 36 is created so as to produce a massaging effect upon the user.

The valve device employed in connection with this massaging cushion apparatus primarily involves two of the valve instrumentalities, of the type previously described, which are intercooperative in a certain novel manner. Each of the valve instrumentalities controls the flow of fluid to a respective one of the flexible chambers of the massaging cushion and both from a single source of fluid pressure.

Thus the valve device of Fig. 5 comprises a first valve instrumentality and a second valve instrumentality, each of said instrumentalities being similar to that illustrated in Fig. 3. Both of these valve instrumentalities in the device of Fig. 5 are connected to a single source of fluid pressure and they are made intercooperative for coordinated operation by the provision of a means of communication between the exhaust pressure chamber of the first instrumentality and the space intermediate the valve elements of the second instrumentality whereby fluid pressure applied to the discharge valve element of the first instrumentality when the latter is in open condition is applied to the discharge valve element of the second instrumentality to oppose opening of the latter valve element.

Now describing the valve construction of Fig. 5 in detail the first valve instrumentality comprises an inlet or supply pressure chamber 37, a supply pressure duct 38 communicating therewith and having a port providing an inlet valve seat 39, an inlet valve element or diaphragm 40 forming one movable wall of the chamber 37 and adapted to cooperate with the valve seat 39 to close off the duct 38 from communication with the chamber 37; an exhaust chamber 41, a discharge duct 42 communicating therewith and having a port providing a valve seat 43, and a valve element or diaphragm 44 forming one movable wall of the chamber 41 and adapted to cooperate with the valve seat 43 to close off the duct 42 from communication with said chamber 41. The valve elements 40 and 44 are interconnected by a solid connector 45 for opposed operation whereby when one element is moved toward open position the other is moved toward closed position, said elements 40 and 44 together providing an integral movable valve member, as described above in connection with the embodiment of Figs. 1 and 2. Inlet chamber 37 is provided with outlet ports 46 communicating through delivery passage 47 with a discharge duct 42. The total effective area of the ports 46 is less than the effective orifice area between the valve element 40 and the seat 39 when the valve element 40 is in fully open position.

Exhaust chamber 41 is provided with ports 48, affording communication of the chamber 41 with the atmosphere. The total effective area of ports 48 is less than the effective orifice area between the valve element 44 and the seat 43 when the valve element 44 is in fully open position. Ports 49 provided in the valve casing afford communication of the atmosphere with the space within the valve casing between the valve elements 40 and 44. A duct 50 affords communication between the discharge duct 43 and the interior of the flexible chamber 35 of the massaging cushion 34.

The second valve instrumentality of the construction of Fig. 5 controls the flow of fluid from the fluid supply duct 38' to the flexible chamber 36 of the massaging cushion 34 and is substantially identical with the construction of the first valve instrumentality of Fig. 5, just above described, with the exception that no ports corresponding to ports 49 are provided in the valve casing affording direct communication of the atmosphere with the space within the valve housing between the valve elements 40' and 44'. Instead, a passage 51 provides communication between the exhaust pressure chamber 41 of the first valve instrumentality of Fig. 5 and the space within the valve casing between the valve elements 40' and 44' of the second valve instrumentality of Fig. 5. The purpose of the passage 51 is to apply the fluid pressure existing in the discharge duct 42 of the first valve instrumentality, when the discharge valve element 44 is open, to the rear side of the discharge valve element 44' of the second valve instrumentality to oppose opening of the latter valve element. Since the construction of the second valve instrumentality of Fig. 5 is otherwise identical with the construction of the first valve instrumentality of said figure, like parts of the second valve instrumentality bear corresponding numerals having prime designations.

The interior of the flexible chamber 36 of the massaging cushion 34 is in communication with the duct 42' of the second valve instrumentality through a duct 52.

The fluid supply ducts 38 and 38' communicate with a common fluid supply duct 53 which may be placed in communication with any suitable source of constant fluid pressure. Thus, the first valve instrumentality (40, 44 etc.) controls the flow of fluid from the main fluid supply conduit 53 to the outer flexible chamber 35 of the massaging cushion 34, and the second valve instrumentality (40', 44' etc.) controls the flow of fluid from the main fluid supply conduit 53 to the inner flexible chamber 36 of the massaging cushion 34.

The operation of the apparatus illustrated in Fig. 5 is as follows: Assuming that the system pressure within the flexible chambers 35 and 36 was atmospheric when these chambers were first placed in communication with the respective ducts 50 and 52 and before the supply conduit 53 was placed in communication with a source of fluid pressure, then immediately after the application of the constant supply pressure to the inlet ducts 38 and 38', the system pressure forces acting upon the valve elements 44 and 44' will be less than the supply pressure forces acting upon the valve elements 40 and 40' so that the latter two inlet valve elements will be unseated and the discharge valve elements 44 and 44' will become seated and remain so until the fluid flowing under pressure from the supply conduit 53 through ducts 38, 38', chambers 37, 37', ports 46, 46', ducts 47, 47' and ducts 50, 52 to the chambers 35, 36 creates sufficient pressure in the ducts 42, 42' to provide sufficient system pressure forces acting upon the valve elements 44, 44' to unseat the same.

Assuming that the chamber 35 and chamber 36 systems have the same capacity, then the first time that constant pressure is supplied to conduit 53, the first and second valve means will both remain in supply condition for the same period and will both cycle simultaneously to exhaust condition; that is to say, the maximum system pressures necessary to unseat the valves 44 and 44' will be built up practically simultaneously in the discharge ducts 42 and 42'. However, upon the initial cycle when the valve members 44 and 44' are unseated simultaneously, the valve member 44' will immediately return to its seat so that the second valve instrumentality (40', 44', etc.) is immediately restored to supply condition. On the other hand, when the valve elements 44 and 44' are unseated simultaneously on their initial cycle, the chamber 35 system pressure will act upon the total effective area of the valve element 44 moving it rapidly and positively to fully open position and simultaneously moving its associated valve element 40 to fully closed position closing off duct 38 from communication with the inlet chamber 37. Thereupon the gas will be exhausted from the outer chamber 35 of the massaging cushion 34 through ducts 50 and 42, exhaust chamber 41, and outlet ports 48 to the atmosphere.

The reason that the valve element 44' does not remain open when the two discharge valve elements 44 and 44' are cracked open simultaneously during the initial cycle is because of the fact that when the valve element 44 moves away from its seat 43, some of the fluid discharged from the outer cushion chamber 35 system passes from the exhaust chamber 41 through the passage 51 to the space between the valve elements 40' and 44', (there being no outlet to the atmosphere from the space between the valve elements 40' and 44' except through chamber 41 and ports 48). This causes an immediate building up of pressure in said space which acts with greater effect upon the valve element 44' than upon valve element 40' (because the effective area of diaphragm 44' is greater than the effective area of the diaphragm 40') thereby causing the valve element 44' to return to its seat 43' and valve element 40' to be unseated, thereby placing the second valve instrumentality in supply condition.

Now with the first valve instrumentality 40, 44 in exhaust condition and the second valve instrumentality 40', 44' in supply condition, the said first and second valve instrumentalities are locked in this reverse, or opposite phase, relation. Thereafter, the said first and second valve instrumentalities will cycle simultaneously and in step but in this reverse, or opposite phase, relation, assuming as in the case illustrated in Fig. 5, that the characteristics of the first and second valve means are substantially identical and the capacities of the flexible chambers 35 and 36 are likewise the same.

With the valve means in the condition illustrated in Fig. 5 wherein the first valve instrumentality 40, 44 is in exhaust condition and the second valve instrumentality 40', 44' is in supply condition, the said first valve instrumentality 40, 44 will remain in exhaust condition until sufficient gas has been exhausted from the chamber 35 system through the ports 48 to the atmosphere so that the system 35 pressure force acting upon the valve element 44 has decreased to a value at which it is exceeded by the supply pressure force acting upon the valve element 40, at which time the first valve instrumentality 40, 44 will cycle to supply condition with the valve 40 unseated and the valve element 44 seated against the seat 43. Likewise the second valve instrumentality 40', 44' will remain in supply condition until the system 36 pressure force acting against the valve 44' exceeds the supply pressure force acting against the valve 40' at which time the second valve instrumentality 40', 44' will cycle to exhaust condition with the valve 44' open and the valve 40' seated against its seat 39'. As soon as the first valve instrumentality 40, 44 moves to supply condition, the space between the valve elements 40' and 44' is vented to atmosphere through the passage 51, chamber 41 and ports 48. The first and second valve instrumentalities will now continue to cycle independently of one another, yet simultaneously or in step and in their reverse, or out of phase relation if the characteristics of the first and second valve means are substantially identical and the capacities of the flexible chambers 35 and 36 are substantially the same. In the event, however, that the first and second valve instrumentalities should get out of step with one another, they will be brought back into step and into the exact reverse, or out-of-phase relation whenever the first valve instrumentality 40, 44 cycles to exhaust condition, by reason of the pressure which is built up in the space between the valve members 40', 44' through the passage 51 under such condition.

Thus, the supply and exhaust cycles of the respective first and second valve instrumentalities will repeat themselves in reverse relation; that is to say, first one valve instrumentality will move to supply condition while the other valve instrumentality remains in exhaust condition and then the valve instrumentality in supply condition will move to exhaust condition while the valve means in supply condition moves to exhaust condition.

The result of the foregoing operation of the valve means of Fig. 5 is to cause a build-up of pressure in one of the flexible chambers 35 and 36 while the pressure is being reduced in the other of said chambers after which the build-up and reduction of pressure is reversed as to these chambers. In the use of the massaging cushion, the person sitting upon same will first have the parts of his body supported upon the flexible chamber 35 raised up while the parts of the body supported upon the flexible chamber 36 are lowered following which the action is reversed so that the parts of the body supported upon the chamber 36 are raised up and the parts of the body supported on the chamber 35 are lowered. This produces a massaging effect which induces circulation and relieves fatigue and numbness in the parts of the body which would otherwise be subject to extreme discomfort from the necessity of being maintained in a fixed position for long periods of time.

Now referring to the modification shown in Figs. 6 to 9, inclusive, there is illustrated a valve device of the invention diagrammatically shown in Fig. 6 as applied to the control of a windshield wiper motor. The valve device of Figs. 6 to 9 is generally indicated by the numeral 100 and comprises a housing generally indicated by the numeral 101 having a supply pressure port 153 communicating through a pipe 102 with the delivery side of a pump 103. The housing 101 is also provided with an outlet port 104 communicating through a pipe 105 with a reservoir 106 for containing a reserve supply of hydraulic fluid. The reservoir 106 communicates through a pipe 107 with the suction side of the pump 103. The housing 101 is also provided with two other ports 150 and 152. The port 150 communicates through a pipe 108 with one end of a fluid pressure motor cylinder 109. The other port 152 communicates through a pipe 110 with the other end of the fluid pressure motor cylinder 109. The cylinder 109 has reciprocably mounted therein a piston 111 adapted to be actuated by fluid pressure alternately applied to the interior of the cylinder, first at one side of the piston 111 and then at the other side of the piston 111. The piston 111 has associated therewith a rack 112 adapted to mesh with a pinion 113 secured to a windshield wiper shaft adapted to be actuated by movement of the piston 111 within the cylinder 109.

Figure 8:
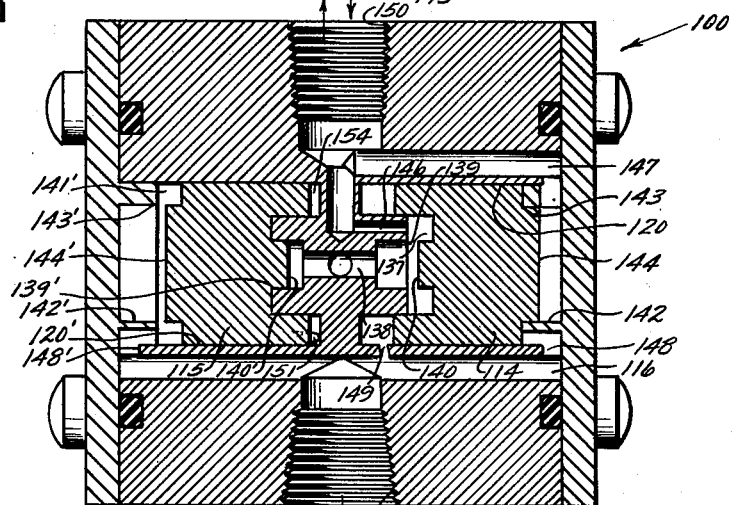
Fig. 8 is a sectional view taken about on the line 8—8 of Fig. 6.
Figure 9:
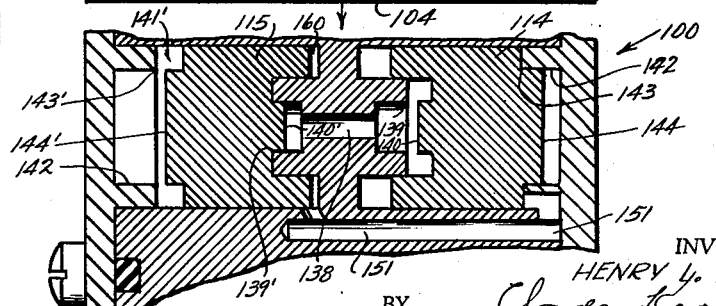
Fig. 9 is a sectional view taken about on the line 9—9 of Fig. 6.

Referring now more particularly to Figs. 7, 8, and 9, the valve device of this modification is similar in construction to the valve device illustrated in Fig. 5. However, the valve device of Figs. 6 to 9, inclusive, embodies an arrangement of pistons, each providing the valve elements corresponding in function to the diaphragm valve elements 40, 44 and 40', 44' of Fig. 5. In view of the similarity of the construction of Fig. 5 and the construction of Figs. 7 to 9, similar elements in the latter construction have been designated by similar numerals in the 100 series. Thus, the construction of Figs. 7 to 9 comprises the pistons 114 and 115 slidable in suitable bores provided in the housing 101 and the opposite ends of the respective pistons 114 and 115 function as respective valve elements 140, 144 and 140', 144', respectively, corresponding to the valve elements 40, 44 and 40', 44' of the Fig. 5 construction.

In the construction of Figs. 7 to 9, the supply pressure port 153 communicates with the inlet duct 138 having a port providing an inlet valve seat 139 at one end of the duct 138. The piston 114 is slidable in a bore 120 in the housing 101. This piston 114 is provided at one end with an inlet valve element 140, and at its opposite end is provided with a discharge valve element 144. The inlet valve element 140 is adapted to cooperate with the valve seat 139 and the discharge valve element 144 is adapted to cooperate with the valve seat 143 provided by the discharge duct 142. When the piston 114 is in the position illustrated in Figs. 7 to 9, communication is afforded, through inlet chamber 137, between the inlet duct 138 and the passage 146 communicating with port 150 and also, through a passage 147, with the discharge duct 142. Inlet chamber 137 is provided between the piston 114 and seat 139 when the piston is moved so that the valve element 140 is unseated. In the condition illustrated in Figs. 7 to 9, the discharge valve element 144 is seated in cooperation with the seat 143 so as to prevent fluid flow from the discharge duct 142. When the piston 114 is moved so that the valve element 140 is seated in cooperation with the seat 139, the valve element 144 is moved away from the seat 143, affording communication between the discharge duct 142 and the outlet passage 116 through a restriction 148, the effective orifice of which is less than the effective orifice between the seat 143 and the discharge valve element 144 when the latter is in fully open position. It may be noted also that the effective orifice provided by the passage 146 is less than the effective orifice provided between the inlet valve element 140 and the seat 139 when the valve element 140 is fully unseated. The structure thus far described corresponds to the first valve instrumentality including the valve elements 40, 44 of Fig. 5, the first valve instrumentality in the construction of Figs. 7 to 9 providing an inlet valve element 140 which is adapted to be loaded by the supply pressure admitted through the inlet port 153 until the valve element 140 is withdrawn from the seat 139 affording communication between the duct 138 and the passage 146, whereupon pressure is built up in the duct 142 acting upon the opposite end of the piston 114 so as to tend to unseat the valve element 144.

Similarly, the piston 115 provides an inlet valve element 140' at one end of said piston and a discharge valve element 144' at the other end of said piston. The valve element 140' is adapted to cooperate with the seat 139' provided at one end of the duct 138 and the discharge valve element 144' is adapted to cooperate with the seat 143' provided by the discharge duct 142'. The piston 115 with its valve elements 140' and 144' and cooperating seats 139' and 143' provides a second valve instrumentality in the construction of Figs. 7 to 9 corresponding to the second valve instrumentality in the construction of Fig. 5. When the inlet valve element 140' is unseated communication is afforded between the duct 138 and the passage 146', communicating with the port 152 and also through a passage 147' with the discharge duct 142'. This enables the pressure to be built up in the duct 142' acting to move against the opposite end of the piston 115 to tend to move the same so as to unseat the discharge valve element 144'. When the discharge valve element 144' is unseated, communication is afforded between the duct 142' and the outlet passage 116 through a restriction 148', the effective orifice of which is less than the effective orifice between the seat 143' and the discharge valve element 144' when the latter is in fully open condition.

A passage 151 provides communication between discharge duct 142 and the space 160 at the end of the piston 115 opposite that provided with the discharge valve element 144'. Thus, passage 151 provides a means whereby the discharge or exhaust pressure of the first valve instrumentality is applied to the rear side of the discharge valve element 144' of the second valve instrumentality to oppose opening of said latter element. The passage 151 therefore effectively performs the function of the passage 51 in the construction of Fig. 5, namely, to lock the second valve instrumentality (140', 144', etc.) in supply condition whenever the first valve instrumentality 140, 144 is moved to exhaust condition. The ambient pressure port 149 affords communication between the space at the rear side of piston 115 and the common outlet passage 116. This port 149 therefore effectively performs the function of the ports 49 of the construction of Fig. 5 in that it provides a pressure at the rear side of the piston 114 which remains substantially constant irrespective of changes in ambient pressure.

It will be seen from the foregoing that the operation of the valve means of construction of Figs. 6 to 9 is substantially the same as the operation of the valve means of the construction of Fig. 5. The operation of the apparatus of Figs. 6 to 9 may be briefly described as follows:

Assuming that the valve means 100 is connected, as illustrated diagrammatically in Fig. 6, for operation of the piston 111 in the cylinder 109, and that the pump 103 is operating, a constant fluid pressure is introduced to the inlet or supply pressure port 153 and shortly thereafter the pistons 114 and 115 will assume their reverse or opposite phase relation with the piston 114 in supply condition and the piston 115 in exhaust condition as illustrated in Figs. 7 to 9. Once this relation is assumed, the respective valve instrumentalities (140, 144, etc., and 140', 144', etc.) will cycle periodically between their respective supply and exhaust conditions. Assuming that the corresponding valve elements provided by the pistons 114 and 115 are substantially identical, the pistons 114 and 115 will continue to cycle in their reverse or out-of-phase relation and this will cause fluid to be supplied from the port 159 through the pipe 108 to the interior of the cylinder 109 to move the piston 111 downwardly referring to Fig. 6. At the same time fluid will be exhausted from the cylinder 109 at the lower side of the piston 111 through pipe 110 to port 152. When this condition has obtained for a predetermined period determined by the stroke of piston 111, the operation will be reversed due to reversal of the positions of the pistons 114 and 115 so that fluid will now be supplied from the port 152 through pipe 110 to the interior of the cylinder 109 causing the piston 111 to move upwardly and the fluid in the cylinder 109 above the piston 111 to be exhausted through pipe 108 to the port 150. Thus, pressure is alternately built up and relieved at the opposite sides of the piston 111, causing a reciprocating movement of the piston 111 within the cylinder 109 which will serve to rotate the pinion 103 first in one direction and then in the other direction to operate a windshield wiper arm in the usual manner.

Having thus described my invention what I claim as new and desire to secure by Letters Patent of the United States is:

1. A valve device comprising a duct providing an inlet port, a first movable valve element cooperable with said inlet port, a second duct providing a discharge port, a second movable valve element cooperable with said discharge port, said ducts each comprising means for subjecting the respective valve elements to the influence of fluid pressure tending to move said elements to open positions, each of said valve elements having a greater fluid pressure loading capacity tending to move it toward an open position when said element is in an open position than when said element is in a closed position, means interconnecting said valve elements for opposed operation whereby when one of said elements is moved toward open position the other of said valve elements is moved toward closed position, means providing a first outlet port and means of communication between said inlet port and said first outlet port when the first valve element is in open position, means providing a second outlet port and means of communication between said discharge port and said second outlet port when said discharge valve element is in open position, and means of communication between the first outlet port and the second duct.

2. A valve device as claimed in claim 1 wherein the effective orifice of said first outlet port is less than the effective orifice between the inlet valve element and the inlet port when the inlet valve element is in fully open position, and the effective orifice of said second outlet port is less than the effective orifice between the discharge valve element and the discharge port when the discharge valve element is in fully open position.

3. A valve device as claimed in claim 1 wherein the effective orifice of said first outlet port is less than the effective orifice between the inlet valve element and the inlet port when the inlet valve element is in fully open position, and the effective orifice of said second outlet port is less than the effective orifice between the discharge valve element and the discharge port when the discharge valve element is in fully open position, one of said valve elements having a fluid pressure loading capacity when in closed position greater than the fluid pressure loading capacity of the other valve element when the latter is in open position.

4. A valve device comprising a duct providing an inlet port, a first movable valve element cooperable with said inlet port, a second duct providing a discharge port, a second movable valve element cooperable with said discharge port, said ducts each providing means for subjecting the respective valve element to the influence of fluid pressure tending to move the same to open positions, each of said valve elements having a greater fluid pressure loading capacity tending to move it toward an open position when said element is in an open position than when said element is in a closed position, means interconnecting said valve elements for opposed operation whereby when one of said elements is moved toward open position the other of said valve elements is moved to a closed position, and means of communication between said inlet port and said second duct when said first movable valve element is in open position.

5. A valve device as claimed in claim 4 wherein one of said valve elements has a greater fluid pressure loading capacity when in closed position than the fluid pressure loading capacity of other valve element when the latter is in an open position.

6. In a valve apparatus a supply pressure chamber, a supply duct communicating therewith and having an inlet valve seat, an inlet valve element forming one wall of said chamber and cooperable with said seat to close off said duct from communication with said chamber, a delivery duct communicating with said chamber for delivering gas to a person's tracheal passage, an exhaust pressure chamber, a discharge duct communicating with said exhaust pressure chamber and with said delivery duct and having a discharge valve seat, a discharge valve element forming one wall of said exhaust pressure chamber and cooperable with said discharge valve seat to cut off said discharge duct from communication with said exhaust pressure chamber, said ducts each providing means for subjecting the respective valve elements to the influence of fluid pressure tending to move the same to open positions, each of said valve elements having a greater fluid pressure loading capacity tending to move it toward open position when the respective valve element is in an open position than when it is in a closed position, and means interconnecting said valve elements for opposed operation whereby when one of said elements is moved toward open position the other of said elements is moved toward closed position.

7. A valve apparatus as claimed in claim 6 wherein said chambers each have a respective outlet port, said delivery duct communicating with the supply chamber through the outlet port therein, the outlet port in said exhaust pressure chamber communicating with the atmosphere, the effective orifice of the supply pressure outlet port being less than the effective orifice between the inlet valve element and the inlet valve seat when the inlet valve element is in fully open position, and the effective orifice of the exhaust chamber outlet port being less than the effective orifice between the discharge valve element and the discharge port when the discharge valve element is in fully open position, one of said valve elements having a fluid pressure loading capacity when in closed position greater than the fluid pressure loading capacity of the other valve element when the latter is in open position.

8. A valve device comprising a supply pressure chamber, a supply pressure duct communicating therewith and having an inlet valve seat, an impervious inlet valve element forming one wall of said chamber and cooperable with said seat to close off said duct from communication with said chamber, an exhaust pressure chamber, a discharge duct communicating with said exhaust pressure chamber and having a discharge valve seat, a discharge valve element forming one impervious wall of said exhaust pressure chamber and cooperable with said discharge valve seat to cut off said discharge duct from communication with said exhaust pressure chamber, said ducts each providing means for subjecting the respective valve elements to the influence of fluid pressure tending to move the same to open positions, each of said valve elements having a greater fluid pressure loading capacity tending to move it toward open position when the respective valve element is in open position than when it is in closed position, means interconnecting said valve elements for opposed operation whereby when one of said elements is moved toward open position, the other of said valve elements is moved toward closed position, and means of communication between the supply chamber and the discharge duct.

9. A dual valve device comprising first and second valve instrumentalities, each of said instrumentalities comprising a first movable valve element, means for subjecting the first valve element to the influence of fluid pressure tending to move it toward open position, a second movable valve element, second means for subjecting said second valve element to the influence of fluid pressure tending to move it toward open position, and means interconnecting said valve elements for opposed operation whereby when one of said elements is moved toward open position the other of said elements is moved toward closed position, each of said valve elements having a greater fluid pressure loading capacity tending to move it toward its open position when the respective valve element is in its open position than when it is in its closed position, means for subjecting the valve elements of said first instrumentality to the influence of ambient pressure, and means for applying the fluid pressure applied to one of the valve elements of the first instrumentality to one of the valve elements of the second instrumentality to oppose opening of the latter valve element.

10. A valve device comprising first and second valve instrumentalities, each of said valve instrumentalities comprising a supply pressure chamber, a supply duct communicating therewith and having an inlet valve seat, an inlet valve element cooperable with said seat to close off said duct from communication with said chamber, an exhaust pressure chamber, a discharge duct communicating with said exhaust pressure chamber and having a discharge valve seat, a discharge valve element cooperable with said discharge valve seat to cut off said discharge duct from communication with said exhaust chamber, said ducts each providing means for subjecting the respective valve element to the influence of fluid pressure tending to move it to open position, each of said valve elements having a greater fluid pressure loading capacity tending to move it toward open position when the respective valve element is in open position than when it is in a closed position, means interconnecting said valve elements for opposed operation whereby when one of said elements is moved toward open position the other of said elements is moved toward closed position, means of communication between the supply chamber and the discharge duct, and means of communication between the exhaust chamber of the first valve instrumentality and the rear side of the discharge valve element of the second valve instrumentality whereby the fluid pressure existing in said exhaust chamber is applied to said latter valve element to oppose opening of the same.

11. In massaging means of the class described, in combination, a cushion comprising a pair of flexible chambers, a valve device comprising first and second valve instrumentalities, each of said instrumentalities comprising a movable valve element, means for subjecting said element to the influence of fluid pressure tending to move it toward open position, a second movable valve element, second means for subjecting said second element to the influence of fluid pressure tending to move it toward an open position, and means interconnecting said valve elements for opposed operation whereby when one of said valve elements moved toward open position the other of said valve elements is moved toward closed position, each of said valve elements having a greater fluid pressure loading capacity tending to move it toward open position when the respective valve element is in an open position than when it is in closed position, means for subjecting the valve elements of said first instrumentality to the influence of ambient pressure, and means for applying fluid pressure applied to one of the valve elements of the first instrumentality to one of the valve elements of the second instrumentality to oppose opening of the latter valve element, in each of said instrumentalities said second means comprising a duct, and a means of communication between each respective duct and the interior of a respective flexible chamber.

12. A valve device comprising a housing having an inlet port and a discharge port, each of said ports providing a respective valve seat, a piston slidable in said housing, said piston being provided at one end with an inlet valve element cooperable with said inlet valve seat, said piston being provided at its opposite end with a discharge valve element cooperable with said discharge valve seat, means for applying fluid pressure to said piston at one end thereof whereby to move the piston in a direction to unseat the inlet valve element, and means for applying fluid pressure to the piston at its opposite end whereby to move the piston in a direction to unseat the discharge valve element, each of said valve elements having a greater fluid pressure loading capacity tending to move the respective valve element away from its seat when the valve element is unseated than when it is seated.

13. A valve device as claimed in claim 12 wherein one of the valve elements has a greater fluid pressure loading capacity when seated than the fluid pressure loading capacity of the other valve element when the latter is unseated.

14. A valve device as claimed in claim 9 wherein one of said valve elements has a greater fluid pressure loading capacity when in closed position than the fluid pressure loading capacity of the other valve element when the latter is in open position.

15. A valve device comprising a housing, first and second valve instrumentalities, each of said instrumentalities comprising an inlet port and a discharge port, each of said ports providing a respective valve seat, a piston slidable in said housing, said piston being provided at one end with an inlet valve element cooperable with said inlet valve seat, said piston being provided at its opposite end with a discharge valve element cooperable with said discharge valve seat, means for applying fluid pressure to said piston at one end thereof whereby to move the piston in a direction to unseat the inlet valve element, means for applying fluid pressure to the piston at its opposite end whereby to move the piston in a direction to unseat the discharge valve element, each of said valve elements having a greater fluid pressure loading capacity tending to move the respective valve element away from its seat when said respective valve element is unseated than when it is seated, means for subjecting the valve elements of the first instrumentality to the influence of the ambient pressure, and mean for applying the fluid pressure applied to one of the valve elements of the first instrumentality to one of the valve elements of the second instrumentality to oppose opening of the latter valve element.

16. A valve device comprising first and second valve instrumentalities, each of said instrumentalities comprising means providing an inlet port and a discharge port, each of said ports providing a respective valve seat, a piston slidable in said housing, said piston being provided at one end with an inlet valve element cooperable with said inlet valve seat, said piston being provided at its opposite end with a discharge valve element cooperable with said discharge valve seat, means for applying fluid pressure to said piston at one end thereof whereby to move the piston in a direction to unseat the inlet valve element, means for applying fluid pressure to the piston at its opposite end whereby to move the piston in a direction to unseat the discharge valve element, each of said valve elements having a greater fluid pressure loading capacity tending to move the respective valve element away from its seat when said respective element is unseated than when it is seated, means providing an outlet passage and means of communication between said outlet passage and a respective discharge port when the respective discharge valve element is unseated, means of communication between said outlet passage and the opposite end of the piston of the second instrumentality, and means providing communication when the discharge valve element of the first instrumentality is unseated, between the discharge port of the first instrumentality and the end of the piston of the second instrumentality opposite that having the discharge element, whereby to oppose opening of said latter element.

17. In a fluid pressure apparatus, a cylinder, a piston reciprocable in said cylinder, means for applying fluid pressure to one end of said cylinder to move said piston in one direction relative thereto, means for applying fluid pressure to the opposite end of said cylinder to move said piston in an opposite direction relative thereto, and a valve device for rendering said fluid pressure applying means operative alternately, said valve device comprising first and second valve instrumentalities, each of said instrumentalities comprising a movable valve element, means for subjecting said element to the influence of fluid pressure tending to move it toward open position, a second movable valve element, second means for subjecting said second element to the influence of fluid pressure tending to move it toward open position, and means interconnecting said valve elements for opposed operation whereby when one of said elements is moved toward open position, the other of said elements is moved toward closed position, each of said valve elements having a greater fluid pressure loading capacity tending to move it toward its open position when the respective valve element is in its open position than when it is in its closed position, means for subjecting the valve elements of said first instrumentality to the influence of ambient pressure, each of said means comprising a duct, means for applying the fluid pressure applied to one of the valve elements of the first instrumentality to one of the valve elements of the second instrumentality to oppose opening of the latter valve element, means of communication between one of said ducts and the interior of said cylinder for applying the fluid pressure existing in said duct to said piston to move it in one direction relative to said cylinder, and means of communication between another of said ducts and the interior of said cylinder for applying the fluid pressure existing in said latter duct to said piston to move the latter in an opposite direction relative to said cylinder.

18. A valve device comprising a movable valve element, means for subjecting said element to the influence of fluid pressure tending to move it toward an open position, a second movable valve element, second means for subjecting said second element to the influence of fluid pressure tending to move it toward an open position, and means interconnecting said valve elements for opposed operation whereby when one of said valve elements is moved toward open position the other of said valve elements is moved toward said closed position, each of said valve elements having a greater fluid pressure loading capacity tending to move it toward its open position when the respective valve element is in an open position than when it is in a closed position, one of said valve elements having a fluid pressure loading capacity when in closed position greater than the fluid pressure loading capacity of the other valve element when the latter is in an open position.

19. A valve device comprising a housing having a port providing a first valve seat, a first movable valve element cooperable with said seat, means for subjecting said element to the influence of fluid pressure tending to move said valve element off said seat, said housing having a second port providing a second valve seat, a second movable valve element cooperable with said second seat, means for subjecting said second valve element to the influence of fluid pressure tending to move said second valve element off said second seat, means interconnecting said valve elements for opposed operation whereby when one of said elements is moved away from its seat the other of said elements is moved toward its seat, each of said valve elements having a greater effective area subject to fluid pressure tending to move the respective valve element away from its seat when the respective valve element is unseated than when it is seated, one of said valve elements having an effective area when in seated condition greater than the effective area of the other valve element when the latter is in unseated condition.

20. A valve device comprising a movable valve element, means for subjecting said element to the influence of fluid pressure tending to move it toward an open position, a second movable valve element, second means for subjecting said second element to the influence of fluid pressure tending to move it toward an open position, and means interconnecting said valve elements for opposed operation whereby when one of said valve elements is moved toward open position the other of said valve elements is moved toward closed position, each of said valve elements having a greater fluid pressure loading capacity tending to move it toward its open position when the respective valve element is in an open position than when it is in a closed position, one of said valve elements having a greater fluid pressure loading capacity when in open position than the fluid pressure loading capacity of the other valve element when the latter is in an open position.

21. In a valve device comprising a movable valve element, means for subjecting said element to the influence of fluid pressure tending to move it toward an open position, a second movable valve element, second means for subjecting said second element to the influence of fluid pressure tending to move it toward an open position, and means interconnecting said valve elements for opposed operation whereby when one of said valve elements is moved toward open position the other of said valve elements is moved toward closed position, each of said valve elements having a greater fluid pressure loading capacity tending to move it toward its open position when the respective valve element is in an open position than when it is in a closed position, one of said valve elements having a greater fluid pressure loading capacity when in closed position than the fluid pressure loading capacity of the other valve element when the latter is in closed position, one of said valve elements having a greater fluid pressure loading capacity when in open position than the fluid pressure loading capacity of the other valve element when the latter is in open position, and one of said valve elements having a greater fluid pressure loading capacity when in closed position than the fluid pressure loading capacity of the other valve element when the latter is in an open position.

22. A differential pressure responsive valve device including a casing, an inlet chamber in said casing, conduit means for admitting fluid under pressure to said inlet chamber, an inlet valve in said casing to control admission of fluid under pressure from said conduit means to said inlet chamber, an exhaust chamber in said casing, discharge ports in said exhaust chamber, a conduit adapted to connect said exhaust chamber to a fluid pressure utilizing means, an exhaust valve controlling fluid flow from said last named conduit to said exhaust chamber, means interconnecting said inlet and exhaust valves for opposed operation such that when one valve is seated the other valve is open, the area of the exhaust valve subjected to fluid pressure when seated being greater than the area of the inlet valve subjected to fluid pressure when it is seated, flow restricting conducting means for conducting fluid from said inlet chamber to the utilizing means with a reduction in pressure during flow from the pressure existing in said inlet chamber and means for subjecting said exhaust valve when seated to substantially the terminal pressure in said flow restricting conducting means.

23. The subject matter as claimed in claim 22 in which means are provided for increasing the fluid pressure force acting on said inlet and exhaust valves when either of said valves are open than the fluid pressure force exerted on said valves when seated.

24. A differential pressure valve device for use in oxygen therapy and the like comprising a casing, an inlet conduit connected to said casing and adapted to conduct oxygen under pressure thereto, an inlet chamber in said casing, an inlet valve controlling communication between said inlet conduit and said inlet chamber, a movable wall in said inlet chamber connected to said inlet valve and applying a greater force to said inlet valve to hold the valve in open position after the valve is open than exerted on said inlet valve by the fluid pressure in said inlet conduit when the inlet valve is closed, a fluid pressure transfer conduit in said casing, means providing a flow restricting passage between said inlet chamber and said transfer conduit, an exhaust chamber in said casing, flow restricting passage means connecting said exhaust chamber and the ambient atmosphere, a movable wall in said exhaust chamber having an effective area subject to pressure greater than the effective area of the movable wall in said inlet chamber, an exhaust valve controlling communication between said transfer conduit and said exhaust chamber, an operative connection between the exhaust valve and said exhaust chamber movable wall, said exhaust valve when closed having an area subject to the pressure in said transfer conduit greater than the area of the inlet valve subject to inlet pressure, the movable wall in said exhaust chamber applying a greater force to said exhaust valve to hold the exhaust valve open after the exhaust valve is opened than the force exerted by the pressure in the transfer conduit on the exhaust valve when the same is seated and means interconnecting the inlet and exhaust valves for simultaneous operation such that when either valve is open the other valve is closed.

25. An automatic differential pressure responsive valve device for controlling delivery of gas from a substantially constant pressure source to a utilizing device such as an oxygen mask or the like comprising a valve casing having inlet conduit means adapted for connecting the same to the pressure source and transfer conduit means adapted for connecting the same to the utilizing device for transfer of gas to or from the utilizing device, movable wall means partitioning said casing into inlet and exhaust chambers communicating respectively with said inlet and said transfer conduits, a pair of opposed valves connected to each other and to said movable wall means, one of said valves controlling communication between the inlet conduit and inlet chamber and the other valve controlling communication between said exhaust chamber and said transfer conduit, a means forming a restricted flow passage between said inlet chamber and said transfer passage beyond said exhaust chamber valve and flow restricting passage means connecting said exhaust chamber and the ambient atmosphere, the effective areas of the valve and movable wall in the inlet chamber being less than the effective area of the valve and movable wall in the exhaust chamber, the total pressure force acting on the respective valves being greater when the valves are open than when seated.

26. The subject matter as claimed in claim 24 in which the movable wall comprises a pair of coaxial spaced flexible diaphragms, the central portion of each diaphragm being reinforced to serve as a valve element, said valve elements being connected for simultaneous opposed movement and means in the valve casing for venting the space between the diaphragms to the ambient atmosphere.

HENRY L. BURNS.

REFERENCES CITED

The following references are of record in the file of this patent:

UNITED STATES PATENTS

| Number | Name | Date |
|---|---|---|
| 58,774 | Chesley | Oct. 16, 1866 |
| 149,452 | Dunn | Apr. 7, 1874 |
| 178,469 | Rue | June 6, 1876 |
| 215,496 | West | May 20, 1879 |
| 870,806 | Turner | Nov. 2, 1907 |
| 1,529,384 | Adams | Mar. 10, 1925 |
| 1,645,798 | Callan | Oct. 18, 1927 |
| 1,762,260 | De Motte | June 10, 1930 |
| 2,013,372 | Work | Sept. 3, 1935 |
| 2,028,101 | Fredrickson | Jan. 14, 1936 |
| 2,211,212 | Langdon | Aug. 13, 1940 |
| 2,418,034 | Kizaur | Mar. 25, 1947 |
| 2,473,416 | Emerson | June 14, 1949 |